United States Patent [19]
Tanaka et al.

[11] Patent Number: 5,694,255
[45] Date of Patent: Dec. 2, 1997

[54] ZOOM LENS BARREL WITH ROTATING STOP MECHANISM

[75] Inventors: Masatsune Tanaka, Kuroiso; Junichi Kurita, Ohtawara, both of Japan

[73] Assignee: Nikon Corporation, Tokyo, Japan

[21] Appl. No.: 703,075

[22] Filed: Aug. 26, 1996

[30] Foreign Application Priority Data

Aug. 31, 1995 [JP] Japan .................. 7-223230

[51] Int. Cl.⁶ .................. G02B 15/14; G02B 7/02
[52] U.S. Cl. .................. 359/704; 359/699; 359/826
[58] Field of Search .................. 359/704, 703, 359/694, 739, 823, 699, 700, 740, 826; 396/505

[56] References Cited

U.S. PATENT DOCUMENTS

| | | |
|---|---|---|
| 4,458,990 | 7/1984 | Kawai .................. 359/703 |
| 4,472,031 | 9/1984 | Muryoi .................. 359/704 |
| 4,623,227 | 11/1986 | Kamata .................. 359/699 |
| 4,626,077 | 12/1986 | Yamamoto .................. 359/699 |
| 5,144,490 | 9/1992 | Yamanouchi .................. 359/694 |
| 5,523,815 | 6/1996 | Tamura .................. 354/233 |
| 5,546,234 | 8/1996 | Yamanouchi .................. 359/700 |

*Primary Examiner*—David C. Nelms
*Assistant Examiner*—Ricky Mack

[57] ABSTRACT

A zoom lens barrel comprises a holding drum for holding a stop mechanism and a lens unit, a driving mechanism for making the holding drum move back and forth in an optical-axis direction to adjust a focal length of an optical system, and a stop compensating mechanism for compensating an aperture diameter of the stop mechanism by rotating the holding drum about the optical axis, corresponding to the movement of the holding drum in the optical-axis direction. The holding drum has a rotation permitting portion for enabling a portion for holding the lens unit make a rotational motion about the optical axis with respect to a portion for holding the stop mechanism.

4 Claims, 4 Drawing Sheets

ZOOM LENS BARREL WITH ROTATING STOP MECHANISM

BACKGROUND OF THE INVENTION

1. Field of the Invention

The present invention relates generally to a zoom lens barrel and, more particularly, to a zoom lens barrel including a holding drum for holding together a stop mechanism and a lens unit moving in an optical-axis direction when adjusting a focal length.

2. Related Background Art

This kind of zoom lens barrel has hitherto been structured as illustrated in, e.g., FIGS. 1 through 3. Herein, FIG. 1 is a partial sectional view illustrating a conventional lens barrel. FIGS. 2 and 3 are partial development elevations showing a fixed drum 4 and a slide drum 10. Hereinafter, a construction of the conventional zoom lens barrel 1 will be explained with reference to FIGS. 1 through 3.

A zoom ring 2 is an annular member for adjusting an optical-axis-directional position of a lens unit L1 for adjusting a focal length by an external operation. The zoom ring 2 is provided along an outer periphery of a rear portion of the lens barrel 1 so that the ring 2 is rotatable about an optical axis X.

A cam drum 3 is a cylindrical member so disposed as to be capable of making a relative motion on an outer peripheral surface of the fixed drum 4, and is formed with a cam groove 3a for restricting a motion of the cam drum 3 in an optical-axis direction. Further, the cam drum 3 is provided with a cam pin 5 on an outer peripheral surface of a rear end portion thereof. Herein, the cam pin 5 rotates integrally with the zoom ring 2 and the cam drum 3 about the optical axis X because of its tip engaging with a rectilinear groove 2a formed in an inner peripheral surface of the zoom ring 2 in parallel with the optical axis X.

A cam drum 6 is a cylindrical member so disposed as to be capable of making the relative motion on an inner peripheral surface of the fixed drum 4, and is provided with a cam pin 7 on an outer peripheral surface of a rear portion thereof. Herein, the cam pin 7 penetrates the cam groove 4a, formed in the fixed drum 4, for regulating a position of the cam drum 6 in the optical-axis direction. Further, a head of the cam pin 7 engages with the rectilinear groove 3b formed in the cam drum 3. Accordingly, the cam drum 6 and the cam drum 3 rotate integrally about the optical axis X.

A slide drum 8 is a lens holding drum for holding a lens unit L2 on an inner peripheral surface of a rear end portion thereof. The slide drum 8 is fitted to an inner peripheral surface of the cam drum 6 and is rectilinearly guided by an unillustrated member so as to make a motion only in the optical-axis direction X. Furthermore, a cam pin 9 is provided on an outer peripheral surface of a central portion of the slide drum 8. A tip of the cam pin 9 engages with a cam groove 6a formed in the cam drum 6. Herein, the cam groove 6a serves to regulate a position of the lens unit L2 in the optical-axis direction in accordance with an adjustment of a focal length of an optical system.

A slide drum 10 is a holding drum for holding the lens unit L1 on an inner peripheral surface of its rear end and also holding a stop blade unit 11 for adjusting a quantity of light passing through the optical system so that the stop blade unit 11 becomes adjacent to the front part of the lens unit L1 in the optical-axis direction. The slide drum 10 is disposed as to be capable of making a relative motion on an inner peripheral surface of the slide drum 8, and also has a cam pin 12 on an outer peripheral surface of a front end thereof. The cam pin 12 penetrates a clearance groove 8a formed in the slide drum 8 and engages with a cam groove 4b formed in the fixed drum 4 as well as engaging with a cam groove 6b formed in the cam drum 6. Herein, the cam groove 6b serves to regulate a position of the lens unit L1 in the optical-axis direction when adjusting a focal length of an optical system. Further, the cam groove 4b is a rectilinear groove having a slight crossed-axes angle to the optical axis as illustrated in FIG. 2.

The stop blade unit 11 is constructed mainly of a blade holding ring 11a, a stop drive plate 11b and stop blades (not shown) incorporated in between the blade holding ring 11a and the stop drive plate 11b. The blade holding ring 11a is fixed to the slide drum 10 and serves to support the stop blades. The stop drive plate 11b is a member fitted in a rotatable state to an inner periphery of the blade holding ring 11a, receiving a driving force from a camera body through an unillustrated lever and thereby rotating. The stop blades, with its rotary axis being set in the blade holding ring 11a, are joined to the stop drive plate 11b in a portion different from the rotary axis. Accordingly, when the stop drive plate 11b makes a rotary motion, the stop blades rotate about the rotary axis, thus changing an aperture diameter of the stop blade unit 11.

Next, the operation of the conventional zoom lens barrel in the case of adjusting the focal length of the optical system will be explained.

In the conventional zoom lens barrel 1, when adjusting the focal length of the optical system, the zoom ring 2 is rotationally operated by an outside operation. A rotary motion of the zoom ring 2 is transferred to the cam drum 3 via the cam pin 5, and the cam drum 3 thereby makes a rotary motion.

On the other hand, the rotary motion of the cam drum 3 is transferred to the cam drum 6 through the rectilinear groove 3b and the cam pin 7. Simultaneously, the rotary motion of the cam drum 3 is converted into a motion in the optical-axis direction X by the cam pin 7 and the cam groove 4a. As a result, the cam drum 6 moves backward and forward as the cam drum 6 rotates.

Next, the rotary motion of the cam drum 6 is converted into a rectilinear motion in the optical-axis direction X by the cam groove 6a and the cam pin 9. This rectilinear motion is transferred to the slide drum 8 in combination with the motion of the cam drum 6 itself in the optical-axis direction. The lens unit L2 provided on the inner peripheral surface of the slide drum 8 is thereby moved in the optical-axis direction X and is located in such a position that the focal length of the optical system becomes a value required.

Further, the rotary motion of the cam drum 6 is converted into the motion in the optical-axis direction X by the cam groove 6b and the cam pin 12 and then transferred to the slide drum 10. As a result, the lens unit L1 is also moved in the optical-axis direction X and is thus located in a position suited to the required focal length of the optical system.

Given next is an explanation of a stop compensation of the stop blade unit 11 that is executed in parallel with an adjustment of the focal length of the optical system.

In the conventional zoom lens barrel 1 having the structure shown in FIG. 1, the stop blade unit 11 moves to and fro in the optical-axis direction X in accordance with the motion of the lens unit L1. Therefore, if the aperture diameter of the stop blade unit 11 remains fixed, a substantial stop value actualized by the stop blade unit 11 changes. Then, in the conventional lens barrel, the aperture diameter of the stop blade unit 11 changes according to the movement of the stop blade unit 11 in the optical-axis direction X.

Herein, for changing the aperture diameter of the stop blade unit 11, the blade holding ring 11a and the stop drive plate 11b are required to make the relative motions in a rotating direction about the optical axis X, thereby driving the stop blades. If the stop drive plate 11b is rotated while the blade holding ring 11a remains fixed, however, the rotary motion thereof is transferred to the camera body side through the above-described lever attached to the stop drive plate 11b, and it follows that there changes a stop value recognized and displayed on the side of the camera body. Under such circumstance, normally, the stop drive plate 11b is set in the fixed state, and the blade holding ring 11a is rotated, thereby adjusting the aperture diameter of the stop blade unit 11.

The cam groove 4b is, as described above, provided to rotate the blade holding ring 11a in accordance with the movement of the stop blade unit 11 in the optical-axis direction X. More specifically, the cam groove 4b imparts the rotary motions through an angle of about 2 (two) degrees at the maximum to the cam pin 12 moving in the optical-axis direction X along the configuration of the cam groove 6b. This situation is shown in FIGS. 2 and 3. FIG. 2 shows a case where the lens barrel is in a wide-angle photographing state. FIG. 3 shows a case where the lens barrel is in a telephoto state. As can be seen from FIGS. 2 and 3, when the lens barrel shifts from the wide-angle state to the telephoto state, the cam pin 12 moves to the front end from the rear end of the cam groove 4b, and rotates clockwise (from under to upward in the Figure) as seen from the rear portion of the optical axis. This rotary motion is transferred to the blade holding ring 11a through the slide drum 10, thus performing the stop compensation of the stop blade unit 11. Note that the stop drive plate 11b is fixed by the lever in the rotating direction during the stop compensation and makes the relative motion to the blade holding ring 11a.

As described above, in the conventional zoom lens barrel 1, the slide drum 10 which holds the lens unit L1 incorporates a function to move the lens unit L1 in the optical-axis direction X and at the same time incorporates a function to transfer the rotary motion for performing the stop compensation on the blade holding ring 11a. Accordingly, the rotary motion of the slide drum 10 is restricted by the cam groove 4b. Therefore, the mechanism for transferring the driving force to the slide drum 10 from the zoom ring 2 has a small degree of freedom of design thereof, resulting in a problem of the design being difficult.

Further, because of the smallness in terms of degree of freedom of the design, an empty space (an area A in FIG. 1) is formed on the side of the outer periphery of the lens unit L1. It is therefore difficult to provide a downsized lens barrel by reducing an outside diameter of the lens barrel.

SUMMARY OF THE INVENTION

To obviate the above problems, according to one aspect of the present invention, a zoom lens barrel 21 comprises a holding drum 23 for holding a stop mechanism 11 and a lens unit L1, a driving mechanism 22, 25, 24a for making the holding drum 23 move back and forth in an optical-axis direction to adjust a focal length of an optical system, and a stop compensating mechanism 23h, 28 for compensating an aperture diameter of the stop mechanism 11 by rotating the holding drum 23 about the optical axis, corresponding to the movement of the holding drum 23 in the optical-axis direction. The holding drum 23 has a rotation permitting portion 23d, 23e for enabling a portion 23b for holding the lens unit L1 make a rotational motion about the optical axis with respect to a portion 23a for holding the stop mechanism 11.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Embodiments of the present invention will hereinafter be described in greater detail with reference to the drawings.

Figure 4:
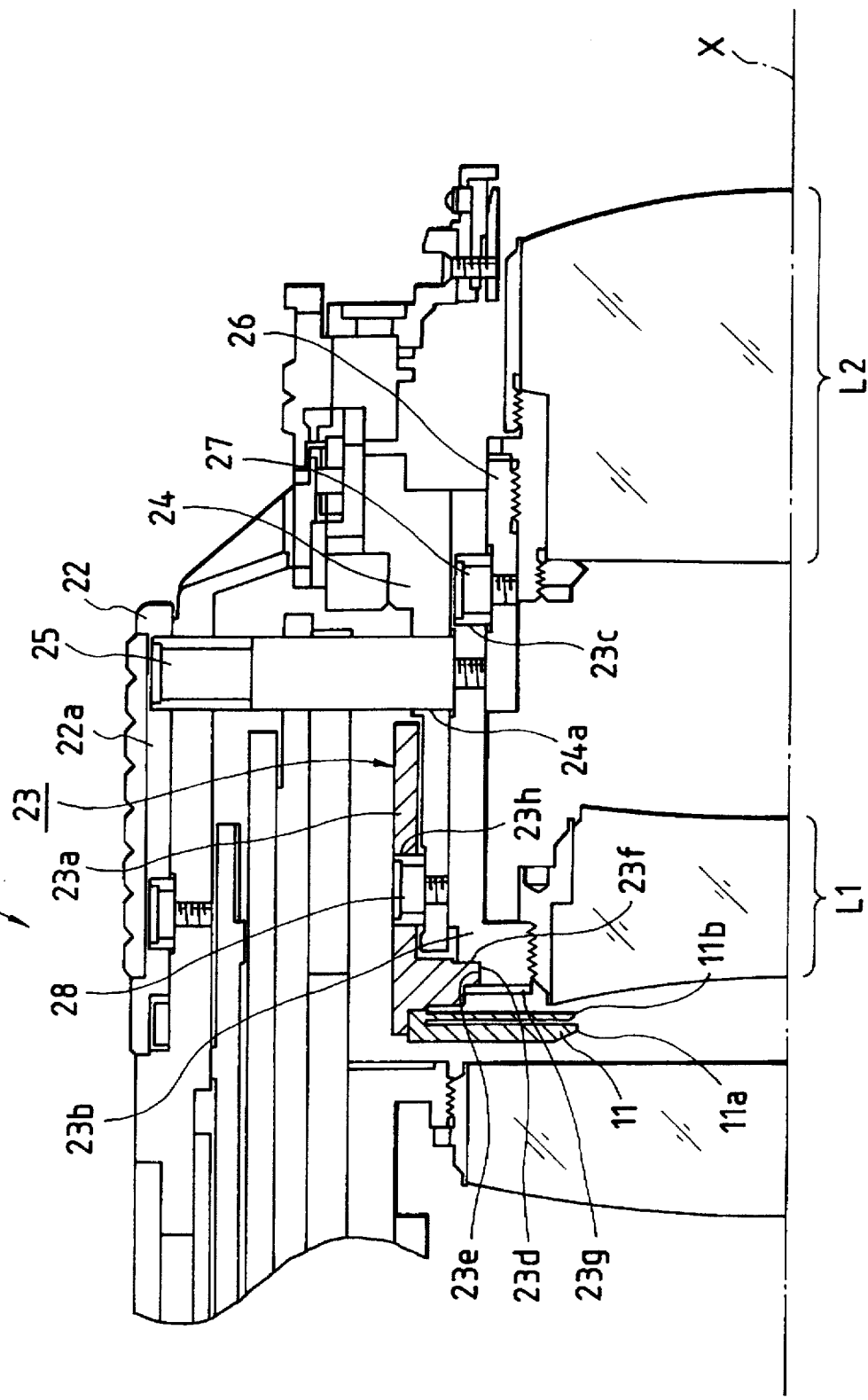
FIG. 4 is a partial sectional view illustrating an embodiment of the present invention.
Figure 5:
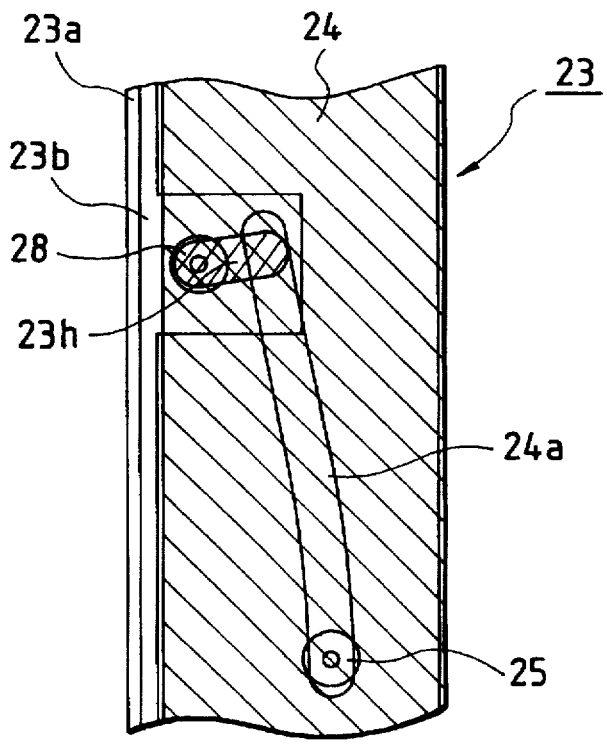
FIG. 5 is a partial development elevation of a fixed drum 24 and a slide drum 23 when a lens barrel in the embodiment of the present invention is in the wide-angle photographing state.
Figure 6:
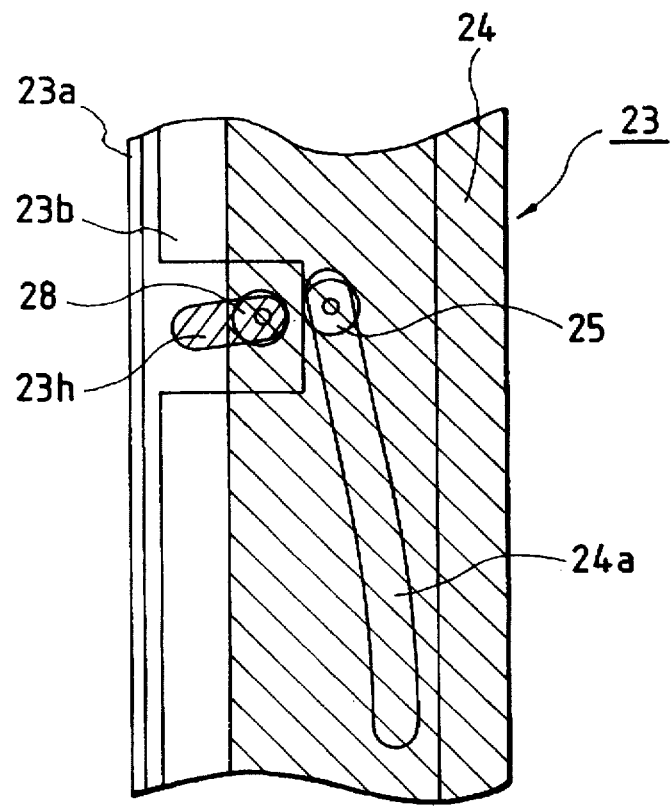
FIG. 6 is a partial development elevation of the fixed drum 24 and the slide drum 23 when the lens barrel in the embodiment of the present invention is in the telephoto photographing state.

FIG. 4 is a partial sectional view showing this embodiment. Further, FIGS. 5 and 6 are partial development elevations illustrating a fixed drum 24 and a slide drum 23 in this embodiment.

To start with, a construction of a zoom lens barrel 21 in this embodiment will be described.

A zoom ring 22 is an annular member for adjusting optical-axis-directional positions of lens units L1, L2 for adjusting a focal length by an external operation. The zoom ring 22 is provided along an outer periphery of a rear portion of a lens barrel 21 so that the ring 22 is rotatable about an optical axis X.

A slide drum 23 is a member corresponding to the slide drum 10 in the conventional art. The slide drum 23 is constructed mainly of a stop holding portion 23a for holding a stop blade unit 11, and a lens holding portion 23b for holding the lens unit L1.

The lens holding portion 23b is a cylindrical member movably fitted to an inner peripheral surface of a fixed drum 24, and holds the lens unit L1 within an inner periphery of a front end thereof. Further, the lens holding portion 23b includes a pin 25 provided on an outer peripheral surface of a rear end thereof. The pin 25 penetrates a cam groove 24a formed in the fixed drum 24, and its tip portion engages with a rectilinear groove 22a formed in an inner periphery of the zoom ring 22. Accordingly, when the zoom ring 22 is rotationally operated from outside, a rotational motion thereof is transferred to the lens holding portion 23b while being converted into a rectilinear motion by the pin 25 and the cam groove 24a. As a result, the lens holding portion 23b makes back-and-forth motions in the optical-axis direction X along a configuration of the cam groove 24a while being rotated so that the lens unit L1 is disposed in a position proper for adjusting a focal point of an optical system.

A slide drum 26 is a cylindrical member, fitted to an inner peripheral surface of the lens holding portion 23b, for holding the lens unit L2 within its inner peripheral surface. Further, the slide drum 26 has a pin 27 on an outer peripheral surface thereof. The pin 27 is a cam pin the tip of which engages with a cam groove 23c formed in the lens holding portion 23b. Moreover, a motion of the slide drum 26 is restricted in the optical-axis direction X by an unillustrated member. Accordingly, a rotary motion of the lens holding portion 23b is converted into a rectilinear motion in the optical-axis direction X by the cam groove 23c and the pin 27 and then transferred to the slide drum 26. As a result, as in the case of the lens unit L1, the lens unit L2 is disposed in a position proper for adjusting the focal point of the optical system.

A stop holding portion 23a is a member for holding a stop blade portion 11 at its front end. A fitting portion 23d provided on an inner peripheral surface is fitted in a rotatable state to a fitting portion 23e provided on an outer peripheral surface of the front end of the lens holding portion 23b, whereby the stop holding portion 23a is supported by the lens holding portion 23b. Further, the stop holding portion 23a is interposed between a front end surface 23f of the lens holding portion 23b and a stopper plate 23g provided at a front end of the lens holding portion 23b and thus held.

Moreover, the stop holding portion 23a and the lens holding portion 23b have a gap in a radial direction about the optical axis X in a portion excluding the fitting portion 23d and the fitting portion 23e as well. The stop holding portion 23a and the lens holding portion 23b are disposed within the lens barrel 21 so that a front portion of the fixed drum 24 is positioned in that gap.

On the other hand, a cam groove 23h is formed in a central portion of the stop holding portion 23a. The cam groove 23h serves to perform an open compensation of the stop blade unit 11 and is a rectilinear groove having a fixed angle to the optical axis X. The cam groove 23h engages with a tip of a pin 28 provided on the front outer peripheral surface of the fixed drum 24. Accordingly, when the stop holding portion 23a makes a relative motion in the optical-axis direction X with respect to the fixed drum 24, the stop holding portion 23a rotates about the optical axis X in accordance with a configuration of the cam groove 23h.

Given next is an explanation of the operation of this embodiment in the case of adjusting the focal length of the optical system.

In the zoom lens barrel 21 in this embodiment, when changing the focal length of the optical system, the zoom ring 22 is rotationally operated by the external operation. The rotational motion of the zoom ring 22 is transferred to the slide drum 23 through the pin 25. As a result, the lens holding portion 23b provided directly with the pin 25 rotates integrally with the zoom ring 22. On the other hand, the stop holding portion 23a and the lens holding portion 23b are in such a state that relative motions in the rotating direction can be performed in the fitting portions 23d, 23e, and hence the rotational motion of the lens holding portion 23b is not transferred to the stop holding portion 23a.

Further, the pin 25 penetrates the cam groove 24a of the fixed drum 24 and therefore makes the back-and-forth motions in the optical-axis direction X along the configuration of the cam groove 24a. Accordingly, the lens holding portion 23b moves to and fro also in the optical-axis direction X in addition to the integral rotation with the zoom ring 22. As a result, the lens unit L1 is located in the position proper for adjusting the focal length desired.

Further, the rotational motion of the lens holding portion 23b is converted into the rectilinear motion in the optical-axis direction X by the cam groove 23c and the pin 27 and then transferred to the slide drum 26. As a consequence, the lens unit L2 is also disposed in the portion suitable for the focal length desired.

Next, there will be described a stop compensation of the stop blade unit 11 that is executed in parallel with an adjustment of the focal length of the optical system.

In accordance with this embodiment, when the lens holding portion 23b moves in the optical-axis direction X to adjust the focal length, the stop holding portion 23a moves integrally with the lens holding portion 23b. The pin 28 fixed to the fixed drum 24 makes the relative motion with respect to the cam groove 23h, with the result that the rotational motion of approximately 2 degrees at the maximum is generated in the stop holding portion 23a in accordance with an inclination of the cam groove 23h to the optical axis X (see FIGS. 5 and 6 showing a positional relationship between the cam groove 23h and the pin 28 when the lens barrel 21 is in a wide-angle photographing status or a telephoto photographing status). This rotational motion is transferred to a blade holding ring 11a via the stop holding portion 23a. As a result, with the operation having already been explained in the conventional art, an aperture diameter of the stop blade unit 11 changes, thus executing the stop compensation.

As discussed above, in accordance with this embodiment, in the slide drum 23 for holding the stop mechanism and the lens unit, the stop holding portion 23a for holding the stop mechanism and the lens holding portion 23b for holding the lens unit are connected via the fitting portions 23d, 23e, and the lens holding portion 23b is thereby rotatable about the optical axis X irrespective of the state of the stop holding portion 23a. In this embodiment, a degree of freedom of the mechanism for transferring the driving force to the lens holding portion 23b from the zoom ring 22 is thereby increased. Then, it is also possible to regulate the motion of the lens holding portion 23b with an extremely simple mechanism having only the single cam pin 25 and the single cam groove 24a.

Figure 1:
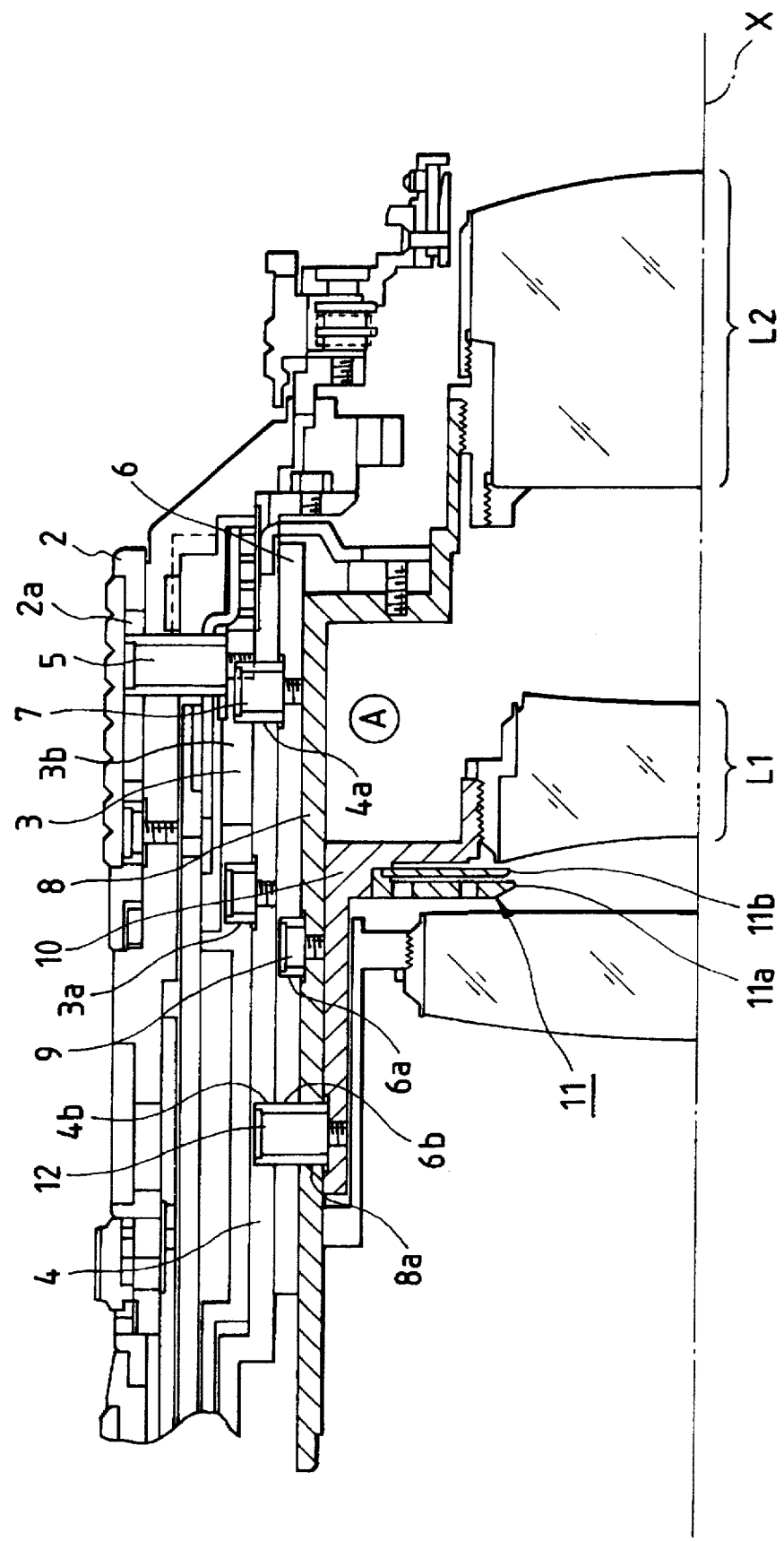
FIG. 1 is a partial sectional view of a conventional lens barrel.
Figure 2:
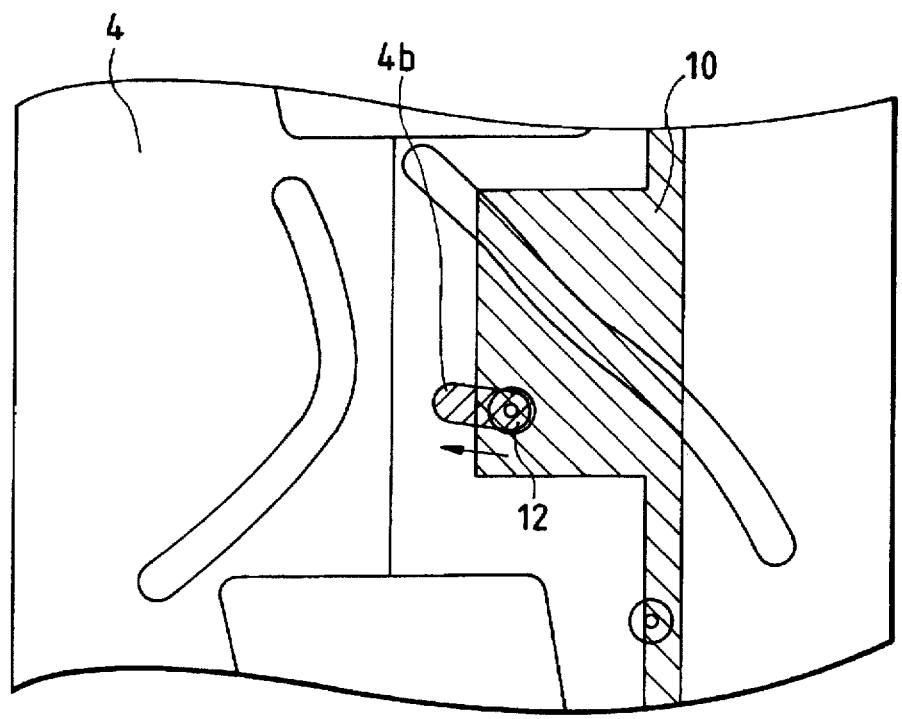
FIG. 2 is a partial development elevation showing a fixed drum 4 and a slide drum 10 when the conventional lens barrel shown in FIG. 1 is in a wide-angle photographing state.
Figure 3:
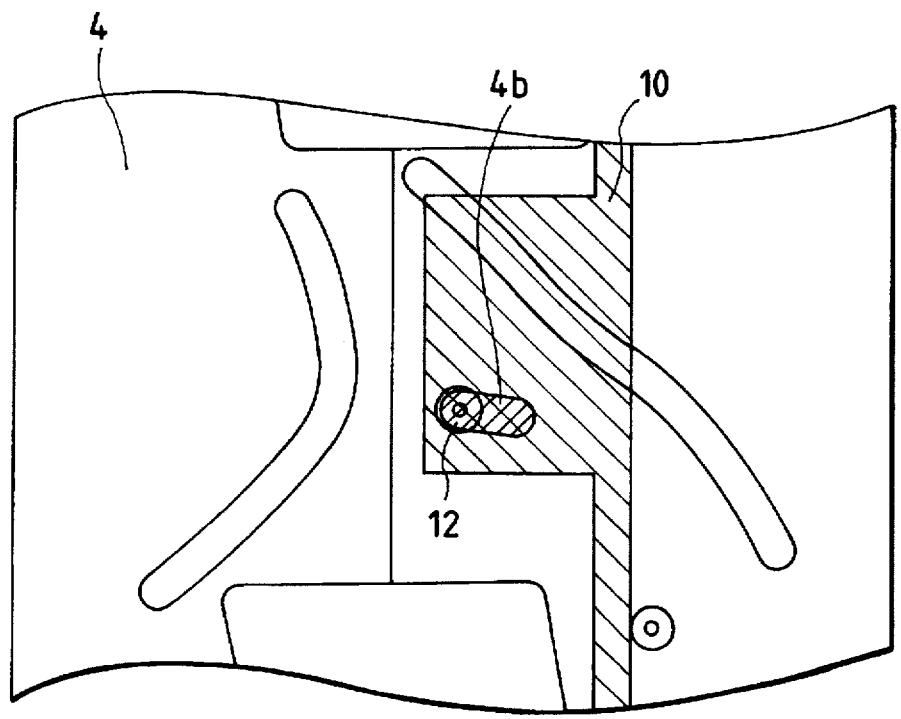
FIG. 3 is a partial development elevation of the fixed drum 4 and the slide drum 10 when the conventional lens barrel shown in FIG. 1 is in the telephoto photographing state.

Further, the lens holding portion 23b is made rotatable, and hence the cam mechanism (24a and 25, 23c and 27, 23h and 28) for moving the lens units L1, L2 or driving the stop blade unit 11 can be disposed in the vicinity of the outer periphery of the lens unit L1. This area corresponds to the area A in FIG. 1 illustrating the example of the conventional art. As obvious from FIG. 1, this area A has hitherto included no mechanism, which is one of causes of hindering the lens barrel from being downsized. That is, in accordance with this embodiment, it is feasible to provide the downsized zoom lens barrel with the small outside diameter by effectively making use of this area.

(Other Embodiments)

Note that the present invention is not limited to the embodiment discussed above. The above-described embodiment is given by way of exemplification. Any modifications, which have substantially the same constructions, operations and effects as the technical concept claimed in the following claims of the present invention are included in the technical scope of the present invention.

For instance, in the embodiment discussed above, the stop holding portion 23a and the lens holding portion 23b are so constructed as to directly contact each other in the fitting portions 23d, 23e. However, a bearing or the like may be provided in the fitting portion 23d or 23e to make the lens holding portion 23b rotatable more smoothly.

As discussed above in great detail, according to the present invention, the holding drum for holding the stop mechanism and the lens unit has the rotation permitting portion between the portion for holding the stop mechanism and the portion for holding the lens unit. The portion for holding the lens unit is capable of making the rotational motion about the optical axis with respect to the portion for holding the stop mechanism. As a result, according to the present invention, the degree of freedom of designing the mechanism for transferring the driving force to the holding drum, whereby the driving force can be transferred to the holding drum with an extremely simple mechanism.

Further, the portion for holding the lens unit of the holding drum is made rotatable, whereby the mechanism for moving the lens unit thereof can be disposed in the space vicinal to the lens unit. It is therefore possible to provide the downsized zoom lens barrel with the small outside diameter.

What is claimed is:

1. A zoom lens barrel comprising:
    a holding drum for holding a stop mechanism and a lens unit;
    a driving mechanism for making said holding drum move back and forth in an optical-axis direction to adjust a focal length of an optical system; and
    a stop compensating mechanism for compensating an aperture diameter of said stop mechanism by rotating said holding drum about the optical axis, corresponding to the movement of said holding drum in the optical-axis direction,
    wherein said holding drum has a rotation permitting portion for enabling a portion for holding said lens unit make a rotational motion about the optical axis with respect to a portion for holding said stop mechanism.

2. A zoom lens barrel comprising:
    a fixed drum;
    a lens unit movable along an optical axis of said zoom lens barrel to change a focal length of said zoom lens barrel;
    a lens holding member, rotatable about the optical axis, for holding said lens unit;
    a stop holding member, rotatable about the optical axis, for holding a stop mechanism, said stop holding member being attached to said lens holding member so as to rotate relatively to said lens holding member and to move along the optical axis together with said lens holding member;
    a zoom ring rotatable about the optical axis of said zoom lens barrel;
    a first pin, fixed to said lens holding member, engaged with a first cam groove formed in said fixed drum and engaged with a rectilinear groove formed in said zoom ring and extending in the optical-axis direction; and
    a second pin, fixed to said fixed drum and engaged with a second cam groove formed in said stop holding member,
    wherein a rotation of said zoom ring causes a rotation of said lens holding member through said first pin,
    said lens holding member rotates about the optical axis by operations of said first pin and said first cam groove and makes said lens unit move along the optical axis to change a focal length of said zoom lens barrel, and
    said stop holding member rotates relatively to said lens holding member by operations of said second pin and said second cam groove while moving along the optical axis together with said lens holding member and thus changes an aperture diameter of said stop mechanism by rotating said stop mechanism about the optical axis.

3. A zoom lens barrel according to claim 2, wherein said stop mechanism has stop blades, a blade holding ring and a stop drive plate,
    said stop drive plate is rotatable relatively to said blade holding ring,
    a rotation of said stop drive plate drives said stop blades to change the aperture diameter of said stop mechanism,
    said blade holding ring rotates about the optical axis together with said stop holding member, and
    said zoom lens barrel further has a lever for inhibiting the rotation of said stop drive plate about the optical axis when said blade holding ring rotates with the rotation of said stop holding member.

4. A lens barrel comprising:
    a lens holding member, movable along an optical axis of said lens barrel, for holding a lens unit;
    a stop holding member, rotatable about the optical axis, for holding a stop mechanism, said stop holding member is attached to said lens holding member so as to rotate relatively to said lens holding member and to move along the optical axis together with said lens holding member; and
    a cam mechanism for rotating said stop holding member about the optical axis when said stop holding member moves along the optical axis together with said lens holding member.

* * * * *

UNITED STATES PATENT AND TRADEMARK OFFICE
CERTIFICATE OF CORRECTION

PATENT NO. : 5,694,255

DATED : December 2, 1997

INVENTOR(S) : Masatsune Tanaka, et al.

It is certified that error appears in the above-identified patent and that said Letters Patent is hereby corrected as shown below:

```
Title page,
item  [73], add --Tochigi Nikon Corporation, Tochigi-ken, Japan--.
```

Signed and Sealed this

Thirtieth Day of June, 1998

Attest:

BRUCE LEHMAN

*Attesting Officer*                *Commissioner of Patents and Trademarks*